(12) United States Patent
Bonnell et al.

(10) Patent No.: US 12,076,824 B2
(45) Date of Patent: Sep. 3, 2024

(54) AUTOMATED MONITORING SYSTEMS FOR WELDING-TYPE PRODUCTION CELLS

(71) Applicant: ILLINOIS TOOL WORKS INC., Glenview, IL (US)

(72) Inventors: Jason Bonnell, Appleton, WI (US); Praveen Dandu, Appleton, WI (US); Leland Falde, Jackson, MI (US); Stephen P. Ivkovich, East Lansing, MI (US); Adam Pliska, Neenah, WI (US); Tret West, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 320 days.

(21) Appl. No.: 16/174,565

(22) Filed: Oct. 30, 2018

(65) Prior Publication Data

US 2020/0130090 A1 Apr. 30, 2020

(51) Int. Cl.
*B23K 9/095* (2006.01)
*B23K 31/12* (2006.01)

(52) U.S. Cl.
CPC .......... *B23K 9/0956* (2013.01); *B23K 9/0953* (2013.01); *B23K 31/125* (2013.01)

(58) Field of Classification Search
CPC .. B23K 9/0956; B23K 9/0953; B23K 31/006; B23K 31/125; B23K 9/095; B23K 11/25;
(Continued)

(56) References Cited

U.S. PATENT DOCUMENTS

| 4,375,026 A | 2/1983 | Kearney |
| 5,714,734 A | 2/1998 | Peterson |

(Continued)

FOREIGN PATENT DOCUMENTS

| CN | 102528227 | 7/2012 |
| CN | 102596476 | 7/2012 |

(Continued)

OTHER PUBLICATIONS

PCT, Notification of Transmittal of the International Search Report and the Written Opinion of the International Searching Authority, or the Declaration, in International application No. PCT/US2016/051579, dated Jan. 10, 2017 (12 pages).

(Continued)

*Primary Examiner* — Dana Ross
*Assistant Examiner* — Joe E Mills, Jr.
(74) *Attorney, Agent, or Firm* — McAndrews, Held & Malloy, Ltd.

(57) ABSTRACT

Some examples relate to a welding-type monitoring system configured to track parts, production, and/or operations within a welding-type production cell. In some examples, the monitoring system comprises a computing system, one or more tags attached to one or more first items, and/or one or more tag readers attached to one or more second items. In some examples, the one or more tags store data relating to the first items, and the one or more tag readers are configured to read the data using a close proximity communication protocol when in range of the one or more tags. After the tag reader reads the data from the tag, the computing system may determine whether one or more workflow events are associated with the data. If so, the computing system may execute an event script corresponding to the workflow event.

19 Claims, 4 Drawing Sheets

(58) Field of Classification Search
CPC ...... B23K 9/10; B23K 37/00; B23K 37/0282; B23K 37/006; B23K 9/127; B23K 9/32; B23K 9/323; B23K 37/0408; B23K 26/0876; B23K 26/02; B23K 9/013; B23K 10/006; B23K 37/0235; B23K 10/00; B23K 9/167; B23K 26/38; B23K 26/0648; B23K 26/14; B23K 15/0046; B23K 10/02; B23K 26/244; B23K 26/082; B23K 26/0643; B23K 9/00; B23K 31/00; B23K 9/126; B23K 37/0461; B23K 37/0435; B23K 9/322; B23K 9/092; B23K 9/173; B23K 9/23; B23K 35/0261; B23K 35/0272; B23K 35/00; B23K 26/211; B23K 9/091; B23K 35/40; B23K 9/164; B23K 9/16; B23K 26/032; B23K 26/034; B23K 26/12; B23K 26/127; B23K 26/123; B23K 11/257; B23K 11/256; B23K 11/255; B23K 11/258; B23K 31/02; B23K 31/12; B23K 11/252; B23K 11/11; G05B 23/02; G05B 19/418; G05B 19/4183; G05B 2219/32001; G05B 2219/32007; G05B 2219/45135; G05B 2219/49302; G05B 19/4155; G05B 19/4187; G05B 19/41875; G05B 19/402; G05B 13/0265; G05B 23/0229; G05B 19/4185; G05B 19/41805; G05B 19/41855; G05B 19/4184; G05B 19/41865; G05B 19/409; G05B 19/40937; G05B 19/414; G05B 19/4063; Y02P 90/02; H04W 4/44; H04W 4/38; H04W 4/80; H04W 4/33; H04W 4/70; H04W 4/06; H04W 52/0235; H04W 56/0015; H04W 12/50; H04W 12/08; H04W 12/02; H04W 76/14; H04W 16/24; G06Q 10/20; G06Q 50/04; G06Q 50/28; G06Q 50/08; G06Q 50/22; G06Q 50/10; G06Q 10/08; G06Q 90/00; G06Q 20/387; G06Q 10/00; G06Q 30/0633; G06Q 30/0283; G06Q 10/10; G06Q 30/04; G06Q 30/0601; G06Q 30/0641; G06Q 10/087; B64C 39/024; G06K 7/1413; G06K 7/10297; G06K 7/10366; G06K 9/6217; G06K 9/6262; G06K 7/10425; G06K 19/00; G06K 19/06037; G06K 19/06028; G06K 7/10009; G06K 7/10891; G06K 7/10396; G06K 19/027; G06K 9/52; G06K 1/125; G06K 7/084; B60W 60/00; G05D 1/0011; B63B 35/00; G01S 5/0263; G01S 5/0295; G01S 1/68; G01S 5/0284; G01S 5/00; G01S 5/0018; G01S 17/89; G01S 7/4817; G06F 16/9035; G06F 3/016; G06F 3/0346; G06F 3/017; G06F 3/167; G06F 30/00; G06F 7/5443; G06F 21/35; G06F 1/1694; G06F 1/163; G06F 3/048; H04L 67/22; H04L 67/12; H04L 67/14; H04L 67/18; H04L 67/10; H04L 41/046; H04L 63/00; H04L 67/00; H04L 12/22; H04L 9/32; H04L 43/106; H04L 12/12; H04L 67/125; H04L 67/04; H04L 69/329; G06T 1/0014; G06T 7/0006; G06T 7/73; G06T 7/60; G06T 7/0004; G06N 7/02; G06N 20/00; G06N 5/04; G06N 7/005; G06N 3/02; G01C 21/206; G01C 22/006; G16H 40/20; G16H 40/63; G16Z 99/00; G09B 5/02; G09B 19/00; G09B 19/24; B25J 9/1697; B25J 11/0055; G07C 9/28; G07C 9/22; G07C 1/10; H04B 5/0031; H04B 5/0025; H04B 17/23; H04B 17/27; H04B 17/318; H04B 1/713; H04B 5/0062; D06F 93/00; G08B 21/24; G08B 21/0423; G08B 5/226; G08B 6/00; G08B 21/16; G08B 21/14; G08C 17/02; G01N 27/4075; G01N 21/954; G01N 29/07; G01N 29/225; G01N 29/228; G01N 29/2487; G01N 29/265; G01N 29/28; H04R 1/10; G07G 1/0045; G01B 11/2441; G01B 11/22; G01B 5/0037; B21C 51/00; B21C 1/12; F24F 11/89; H04M 11/002

See application file for complete search history.

(56) References Cited

U.S. PATENT DOCUMENTS

| | | | |
|---|---|---|---|
| 5,756,967 A | 5/1998 | Quinn | |
| 6,484,584 B2 | 11/2002 | Johnson et al. | |
| 6,510,984 B2 | 1/2003 | Blankenship | |
| 6,583,386 B1 | 6/2003 | Ivkovich | |
| 6,624,388 B1* | 9/2003 | Blankenship | B23K 9/1087 |
| | | | 219/130.5 |
| 7,032,814 B2 | 4/2006 | Blankenship | |
| 7,375,304 B2 | 5/2008 | Kainec | |
| 7,518,484 B2 | 4/2009 | Albarado | |
| 7,996,276 B2 | 8/2011 | Blankenship | |
| 9,104,195 B2 | 8/2015 | Daniel | |
| 9,117,154 B2 | 8/2015 | Enyedy | |
| 9,266,182 B2 | 2/2016 | Hung | |
| 9,862,048 B2 | 1/2018 | Holverson et al. | |
| 10,065,260 B2 | 9/2018 | Hutchison | |
| 10,183,351 B2 | 1/2019 | Peters | |
| 2001/0030240 A1 | 10/2001 | Blankenship | |
| 2004/0004113 A1 | 1/2004 | Blankenship | |
| 2005/0127052 A1 | 6/2005 | Spencer | |
| 2005/0197115 A1 | 9/2005 | Clark et al. | |
| 2005/0258154 A1 | 11/2005 | Blankenship | |
| 2007/0052543 A1 | 3/2007 | Albarado | |
| 2007/0080150 A1 | 4/2007 | Albrecht | |
| 2008/0035727 A1* | 2/2008 | Stanzel | G06Q 10/087 |
| | | | 235/385 |
| 2008/0116186 A1 | 5/2008 | Luck et al. | |
| 2008/0149686 A1 | 6/2008 | Daniel | |
| 2008/0276179 A1 | 11/2008 | Borenstein | |
| 2009/0173726 A1 | 7/2009 | Davidson | |
| 2010/0122450 A1* | 5/2010 | Nelson | G06Q 30/0283 |
| | | | 29/592 |
| 2010/0224610 A1 | 9/2010 | Wallace | |
| 2012/0248081 A1 | 10/2012 | Hutchison | |
| 2013/0075380 A1* | 3/2013 | Albrech | B23K 9/1006 |
| | | | 219/137 R |
| 2013/0105556 A1 | 5/2013 | Abell | |
| 2014/0042135 A1* | 2/2014 | Daniel | B23K 9/10 |
| | | | 219/130.5 |
| 2014/0048524 A1 | 2/2014 | Ash | |
| 2014/0124493 A1 | 5/2014 | Enyedy | |
| 2014/0131320 A1 | 5/2014 | Hearn | |
| 2014/0263247 A1* | 9/2014 | Hillen | G07C 9/28 |
| | | | 219/136 |
| 2015/0069029 A1 | 3/2015 | Daniel | |
| 2015/0114941 A1* | 4/2015 | Denis | G08C 17/00 |
| | | | 219/132 |
| 2015/0268663 A1 | 9/2015 | Daniel et al. | |
| 2016/0016250 A1* | 1/2016 | Denis | B23K 9/12 |
| | | | 219/130.1 |
| 2016/0125592 A1 | 5/2016 | Becker et al. | |
| 2016/0125593 A1 | 5/2016 | Becker | |
| 2016/0361774 A9 | 12/2016 | Daniel et al. | |
| 2017/0032281 A1* | 2/2017 | Hsu | B23K 31/125 |
| 2017/0046976 A1* | 2/2017 | Becker | G09B 19/24 |

(56) References Cited

U.S. PATENT DOCUMENTS

| | | | |
|---|---|---|---|
| 2017/0157693 A1* | 6/2017 | Barhorst | B23K 9/0956 |
| 2017/0274467 A1* | 9/2017 | Rajagopalan | B23K 9/0953 |
| 2018/0060831 A1* | 3/2018 | Swift | G08B 25/10 |
| 2018/0178320 A1 | 6/2018 | Webster | |

FOREIGN PATENT DOCUMENTS

| | | |
|---|---|---|
| CN | 102922089 A | 2/2013 |
| CN | 103331506 | 10/2013 |
| CN | 103862135 | 6/2014 |
| CN | 103909325 | 7/2014 |
| CN | 104379291 | 2/2015 |
| CN | 104551372 | 4/2015 |
| DE | 102009016798 A1 | 10/2010 |
| SG | 147352 A1 | 11/2008 |
| WO | 2014149786 A1 | 9/2014 |

OTHER PUBLICATIONS

PCT, Notification of Transmittal of the International Search Report and the Written Opinion of the International Searching Authority, or the Declaration, in Application No. PCT/US2016/051585, dated Dec. 21, 2016 (12 pages).

Canadian Office Action Appln No. 2,996,182 dated Nov. 5, 2019, 5 pages.

International Searching Authority, Search Report and Written Opinion, Application No. PCT/US2011/055225, mailed Feb. 1, 2012, 9 pages.

* cited by examiner

AUTOMATED MONITORING SYSTEMS FOR WELDING-TYPE PRODUCTION CELLS

TECHNICAL FIELD

The present disclosure generally relates to welding-type production cells and, more particularly, to automated monitoring systems for welding-type production cells.

BACKGROUND

Monitoring systems track tasks and/or operations within welding-type production cells (a.k.a. "welding cells" or "weld cells"), as well as information pertaining to the tasks and/or operations. A welding-type production cell may be an area and/or room in which welding and/or welding related tasks are performed. An operator (e.g., human welder and/or robotic welder) may be responsible for completing several welding-type tasks in the weld cell to complete a welding-type operation. Weld cell data acquired by the monitoring system may be used to improve welding efficiency, quality, reliability, testing, notifications, and/or for other suitable purposes.

However, gathering tracking and/or monitoring data can be difficult. Conventional monitoring systems rely on manual input from the operator to gather information. If an operator forgets to enter the information, the monitoring system will fail to have full knowledge of what is occurring at the welding cell. Additionally, manual input of monitoring information can be time consuming and/or inaccurate, resulting in time inefficiencies and/or inaccurate data gathering.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to systems and methods for automated monitoring systems for welding-type production cells, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As utilized herein, the terms "e.g.," and "for example" set off lists of one or more non-limiting examples, instances, or illustrations.

As used herein, the term "welding-type" refers to welding, cladding, plasma cutting, induction heating, laser (including laser welding, laser hybrid, and laser cladding), carbon arc cutting (CAC) or gouging, and/or resistive preheating.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, welding-type power refers to power suitable for welding, cladding, plasma cutting, induction heating, CAC and/or hot wire welding/preheating (including laser welding and laser cladding), carbon arc cutting or gouging, and/or resistive preheating.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, the terms "weld cell," "welding cell," "welding production cell," and/or "welding-type production cell" refer to a room and/or area where one or more workpieces are welded in one or more welding-type operations, such as, for example, an enclosed area, an open area, a welding area proximate to a pipeline, a welding area in a shipyard, a welding bay proximate to a railroad car, a welding construction area, etc.

As used herein, the term "welding operator" refers to either a robotic welder or a person who manually performs the welding.

Some examples of the present disclosure relate to a welding-type monitoring system of a welding-type production cell, comprising a tag attached to a first item associated with the welding-type production cell, the tag storing data relating to the first item, a tag reader attached to a second item associated with the welding-type production cell, the tag reader configured to automatically read data from the tag using a close proximity communication protocol when the tag reader is in communication range of the tag, and a computing device configured to receive the data from the tag reader, identify an event associated with the data, and trigger an event script corresponding to the event in response to identifying the event.

In some examples, the tag is an RFID tag, the tag reader is an RFID interrogator, and the close proximity communication protocol is an RFID protocol. In some examples, the tag is an NFC tag, the tag reader is an NFC interrogator, and the close proximity communication protocol is an NFC protocol. In some examples, the tag is a Bluetooth tag, the tag reader is a Bluetooth interrogator, and the close proximity communication protocol is a Bluetooth protocol. In some examples, the tag is a Zigbee tag, the tag reader is a Zigbee interrogator, and the close proximity communication protocol is a Zigbee protocol. In some examples, the first item or the second item comprises a welding-type equipment, a tool, a workpiece, a storage bin, wearable apparel, a cell fixture, or a portion of the welding-type production cell. In some examples, the wearable apparel comprises a glove, a boot, a helmet, a shirt, a harness, a jacket, pants, a watch, a wristband, a belt, a necklace, glasses, a hat, or an identification tag. In some examples, the welding-type equipment comprises a power supply, a welding cable, a work clamp, a robot arm, a control cabinet, a welding torch, a torch cleaner, an induction heater, a cutter, a clamp, a wire feeder, a gas tank, gas hoses, a grinder, a user interface, a compressed air nozzle, or an air filter. In some examples, the tool comprises a tool box, a torch tip wrench, pliers, a fixture clamp, a free clamp, a cart, or a crane. In some examples, the storage bin comprises a welding tip storage bin, a wire spool storage bin, a scrap bin, a component supply bin, or a completed part bin. In some examples, the cell fixture comprises a gate, a gate locking latch, a wall, a fixture clamp, a ceiling, a floor, a light fixture, a pillar, a window, a conveyor belt, or a sink.

In some examples, the event script comprises one or more actions taken by the computing device or instructions provided to an operator by the computing device. In some examples, the computing device is further configured to trigger a downtime event script in response to determining that a time limit has passed without receiving the data. In some examples, the first item comprises a storage bin, the second item comprises wearable apparel, and the event comprises one or more of a tip change event, a wire change event, a component loading event, a scrap event, and a part completion event. In some examples, the first item comprises wearable apparel, the second item comprises a storage bin, and the event comprises one or more of a tip change event, a wire change event, a component loading event, a scrap event, and a part completion event. In some examples, the first item comprises a command item, the second item comprises wearable apparel, and the event comprises a command event. In some examples, the first item comprises wearable apparel, the second item comprises a command item, and the event comprises a command event. In some examples, the computing device is further configured to log one or more of the event or event script for diagnostic purposes.

Some examples of the present disclosure relate to a method for monitoring a welding-type production cell, comprising receiving data from a tag reader, via a computing device, the tag reader attached to a second item associated with the welding-type production cell and configured to automatically read data from a tag using a close proximity communication protocol when the tag reader is in communication range of the tag, the tag being attached to a first item associated with the welding-type production cell and storing data relating to the first item, identifying an event associated with the data, via the computing device, and triggering an event script corresponding to the event in response to identifying the event, via the computing device.

Some examples of the present disclosure relate to a welding-type monitoring system of a welding-type production cell, comprising a tag attached to an item associated with the welding-type production cell, the tag storing data relating to the item, a plurality of tag readers arranged around the tag, the tag readers configured to read relative position data from the tag using a communication protocol, and a computing device configured to receive the relative position data from the tag readers, determine an actual position of the item based on an analysis of the relative position data, identify an event associated with the actual position of the item, and trigger an event script corresponding to the event in response to identifying the event.

Some examples of the present disclosure relate to a welding-type monitoring system configured to automatically track parts, production, and/or operations within a welding-type production cell. In some examples, the monitoring system comprises a computing system, one or more tags attached to one or more first items, and/or one or more tag readers attached to one or more second items. In some examples, the one or more tags store data relating to the first items, and the one or more tag readers are configured to read the data using a close proximity communication protocol when in range of the one or more tags. After the tag reader reads the data from the tag, the tag data may be communicated to the computing system, which may, in turn process the data to determine whether one or more workflow events are associated with the data. If so, the computing system may execute an event script corresponding to the workflow event.

For example, a tag reader may be attached to a welding operator (and/or to a piece of wearable apparel worn by a welding operator) and tags may be attached to various items within (and/or related to) the welding-type production cell (e.g., welding-type equipment, tools, workpieces, storage bins, cell fixtures, and/or other items). When the welding operator (and/or the tag reader attached to the welding operator) comes into communication range of the tagged item (and/or the tag on the tagged item), the tag reader may read the tag, and send data stored on the tag to the computing system. For example, a tag reader on a glove worn by the operator may read a tag attached to a storage bin containing replacement welding torch contact tips when the operator reaches into the bin to obtain a replacement contact tip. The tag may store data representative of the storage bin and/or contact tips stored within the bin, and the tag reader may read this data and send the data to the computing system. The computing system may then process the data, determine whether one or more workflow events are associated with the data, and, if so, execute an event script corresponding to the workflow event.

Workflow events may be any number of anticipated situations that call for some sort of action within and/or related to the welding-type production cell. In some examples, workflow events may be identified based on a timing and/or order in which tag data is received from one or more tags. Event scripts may include one or more actions taken by the computing device or instructions provided to an operator by the computing device. For example, where the tag reader sends data representative of the storage bin and/or contact tips stored within the bin, the computing system may process the data, determine that the data corresponds to a tip change workflow event, and execute an event script corresponding the tip change workflow event. For example, the event script may involve resetting the tracking of a tip change monitoring algorithm, alerting maintenance, etc.

Example workflow events may include a tip change event, a part identification event, a part loading event, a clamp start/stop event, a torch cleaning event, a wire supply change event, a gas supply change event, a downtime event, a weld cell gate open event, a tool or equipment usage event, an improper bin event, a proper bin event, a low stock bin event, and/or a command event. Example event script actions include alerts, alarms, communications to personnel (e.g., automatically generated text message and/or email messages to maintenance, supervisors, quality assurance, production, procurement, security, etc.), procurement and/or resupply orders, logging of tag and/or event data, and/or display of information (e.g., training images and/or videos, instructional images and/or videos, diagnostic information, graphs, charts, etc.). In some examples, the computing system may also log one or more of the event and/or event script for diagnostic purposes.

In some examples, tag readers and/or tags may be attached to items such as wearable apparel. Wearable apparel may include a glove, a boot, a helmet, a shirt, a harness, a jacket, pants, a watch, a wristband, a belt, a necklace, glasses, a hat, and/or an identification tag. In some examples, tag readers and/or tags may be attached to items such as welding-type equipment. Welding-type equipment may include a power supply, a welding cable, a ground clamp, a robot arm, a control cabinet, a welding torch, a torch cleaner, an induction heater, a cutter, a clamp, a wire feeder, a gas tank, gas hoses, a grinder, a user interface, a compressed air nozzle, and/or an air filter. In some examples, tag readers and/or tags may be attached to tools, such as, for example, grinders, tool boxes, torch tip wrenches, pliers, ground clamps, free clamps, fixture clamps, carts, and/or cranes. In some examples, tag readers and/or tags may be attached to storage bins, such as, for example, contact tip storage bins, wire spool storage bins, scrap bins, component supply bins, and/or completed part bins. In some examples, tag readers and/or tags may be attached to weld cell fixtures, such as, for example, gates, gate locking latches, walls, fixture clamps, ceilings, floors, light fixtures, pillars, windows, conveyor belts, and/or sinks.

In some examples, tag readers and/or tags may use close proximity communication protocols, such as, for example, Radio-Frequency Identification (RFID) communication protocols, near field communication (NFC) communication protocols, ISO 18000, ISO 14443, ISO 15693, and/or ISO 24730 protocols, and/or short-wavelength ultra high frequency (UHF) radio waves in the industrial, scientific, and medical (ISM) radio frequency band, between approximately 2.4 and 2.485 Giga Hertz (GHz) (commonly referred to as Bluetooth®). In some examples, the close proximity communication protocols may be used to read/write tags (e.g., active or passive) and/or other devices, and/or to otherwise communicate within the system.

In some examples, the monitoring system may additionally, or alternatively, use one or more techniques (e.g., triangulation) to determine position within and/or near the welding cell. For example, multiple tag readers may be set up in and/or around the welding cell, such as in a triangle and/or other pattern. One or more longer range communication protocols may be used by the tag readers to locate and/or position the tags relative to the tag readers. For example, some short-wavelength ultra high frequency (UHF) radio waves in the industrial, scientific, and medical (ISM) radio frequency band, between approximately 2.4 and 2.485 Giga Hertz (GHz) (commonly referred to as Bluetooth®) protocols may be used. By using relative location and/or position data collected by several tag readers in known positions to one another, an actual location and/or position of the tag (and/or the tagged item) may be determined. The monitoring system may use the position and/or location data to identify workflow events, and/or to augment other events and/or event scripts with the position and/or location data.

Figure 1:
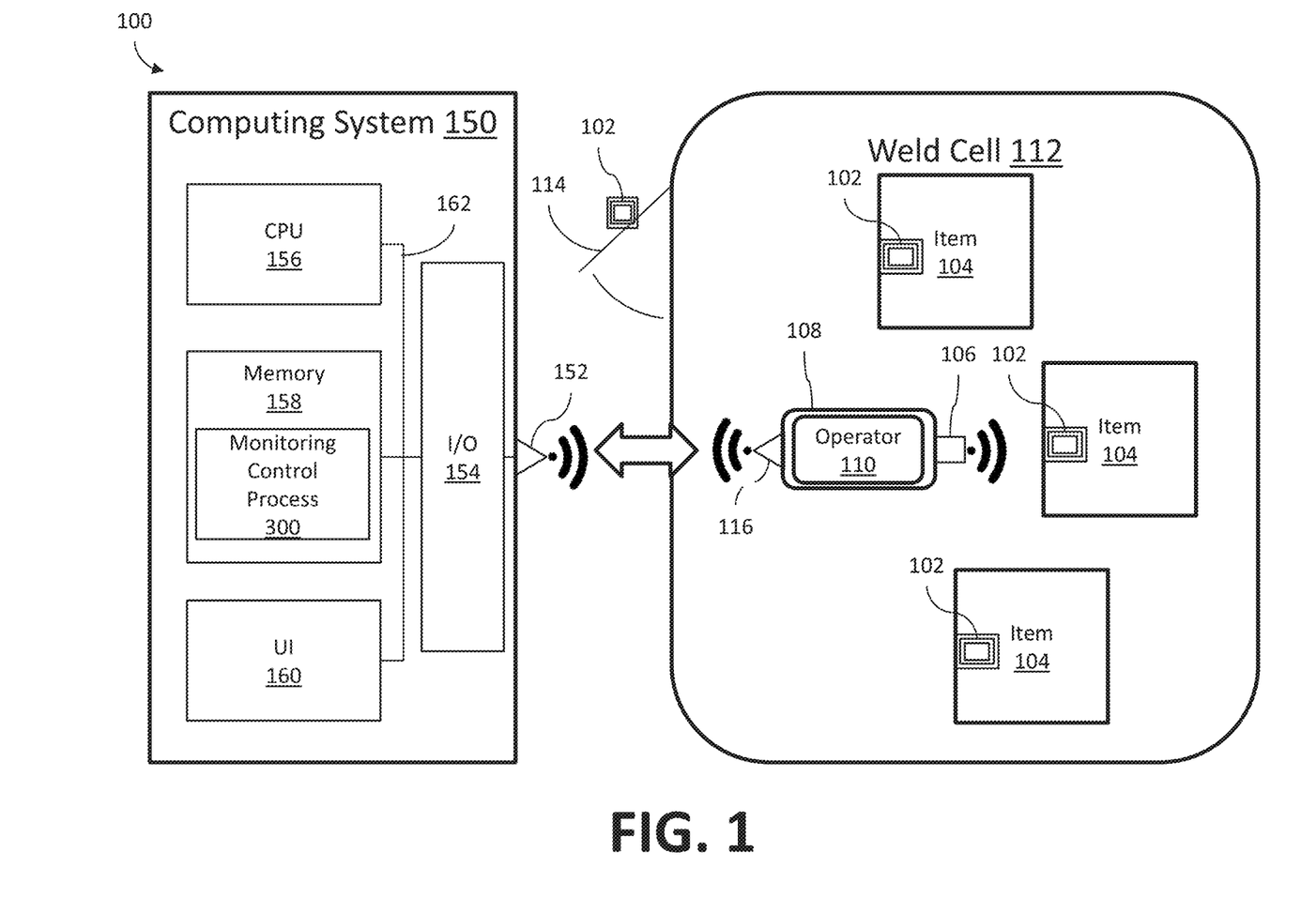
FIG. 1 is a block diagram of an example monitoring system, in accordance with aspects of this disclosure.

FIG. 1 shows an example of a monitoring system 100. As shown, the monitoring system 100 includes a computing system 150, tags 102 attached to various items 104, and a tag reader 106 attached to wearable apparel 108 worn by a welding operator 110. In some examples, wearable apparel 108 may include a glove, a boot, a helmet, a shirt, a harness, a jacket, pants, a watch, a wristband, a belt, a necklace, glasses, a hat, and/or an identification tag. The tags 102, items 104, tag reader 106, wearable apparel 108, and welding operator 110 are shown within a welding-type production cell 112. While the computing system 150 is shown outside of the welding cell 112, in some examples, the computing system 150 may be within the welding cell 112. While the welding operator 110 and items 104 are shown within the welding cell 112, in some examples, the welding operator 110 and/or items 104 may be (and/or move) outside of the welding cell 112. In some examples, the tags 102 may instead be attached to the welding operator 110 (and/or wearable apparel 108), while tag readers 106 are attached to the items 104. In some examples, multiple tag readers 106 (and/or tags 102) may be attached to the welding operator 110 and/or wearable apparel 108. In some examples, multiple tags 102 (and/or tag readers 106) may be attached to each item 102.

In the example of FIG. 1, the welding-type production cell 112 may be an area, space, room, and/or cage where welding-type operations occur. In some examples, the underlying welding process in a welding cell 112 may include, but is not limited to, shielded gas metal arc welding (GMAW or MIG), shielded gas tungsten arc welding (GTAW or TIG), shielded metal arc welding (SMAW or stick welding), flux core arc welding (FCAW), and submerged arc welding (SAW). In examples where the welding-type production cell 112 is a room or cage, the welding cell 112 may include a door 114, such as shown in the example of FIG. 1. As shown, a tag 102 is affixed to the door 114. In some examples, one or more tags 102 may be affixed to one or more locks, latches, deadbolts, hinges, knobs, and/or other portions of the door 114. In some examples, tag readers 106 may be affixed to the door (and/or other portions of the door 114) rather than tags 102.

In the example of FIG. 1, the tags 102 store data representative of (and/or relating to) the items 104 to which they are attached. In some examples, the items 104 may be any item within (and/or related to) the welding-type production cell 112, such as, for example welding-type equipment, tools, workpieces, storage bins, cell fixtures, etc. In some examples, welding-type equipment may include a power supply, a welding cable, a ground clamp, a robot arm, a control cabinet, a welding torch, a torch cleaner, an induction heater, a cutter, a clamp, a wire feeder, a gas tank, gas hoses, a grinder, a user interface, a compressed air nozzle, and/or an air filter. In some examples, tools may include grinders, tool boxes, torch tip wrenches, pliers, ground clamps, free clamps, fixture clamps, carts, and/or cranes. In some examples, storage bins may include contact tip storage bins, wire spool storage bins, scrap bins, component supply bins, and/or completed part bins. In some examples, weld cell fixtures may include gates, gate locking latches, walls, fixture clamps, ceilings, floors, light fixtures, pillars, windows, conveyor belts, and/or sinks. In some examples, one or more items 104 may comprise command items that are associated with a command workflow event having an associated event script that issues a command to welding equipment (e.g., to adjust a parameter of a welding-type power supply, gas supply, welding torch, etc.).

In the example of FIG. 1, the tag reader 106 is configured to read data from the tag 102 using a close proximity communication protocol when in communication range. In some examples, the tag reader 106 may be configured to write data to the tag 102 using the close proximity communication protocol when in communication range. As shown, the tag 102 is an RFID and/or NFC tag, with loop antennas. NFC and/or RFID devices communicate via electromagnetic induction, such as between loop antennas within a common near field associated with each NFC and/or RFID enabled device for data transfer. However, in some examples, the tag reader 106 and/or tag 102 may instead be configured to work with different close range communication protocols. In some examples, tag readers 106 and/or tags 102 may use close proximity communication protocols, such as, for example, Radio-Frequency Identification (RFID) communication protocols, near field communication (NFC) communication protocols, ISO 18000, ISO 14443, ISO 15693, and/or ISO 24730 protocols, and/or short-wavelength ultra high frequency (UHF) radio waves in the industrial, scientific, and medical (ISM) radio frequency band, between approximately 2.4 and 2.485 Giga Hertz (GHz) (commonly referred to as Bluetooth®). In some examples, the tags 102 may be light emitting devices (e.g., light emitting diodes (LEDs)) and the tag readers 106 may be optical detection devices.

In the example of FIG. 1, the tag reader 106 is in electrical communication with a tag reader transceiver 116. As shown, the tag reader transceiver 116 is configured to communicate data read from the tags 102 with a computing system transceiver 152, such as through some wireless communication protocol known in the art. In some examples, associated metadata (e.g., timestamp data, tag reader 106 location and/or attachment data, etc.) may also be communicated. While shown as part of the computing system 150 in FIG. 1, in some examples, the computing system transceiver 152 may instead be separate from the computing system 150, and/or instead be part of some other equipment (e.g., a welding power supply).

As shown, the computing system transceiver 152 is in electrical communication with input/output (I/O) circuitry 154 of the computing system 150. In some examples, the I/O circuitry 154 may include circuitry, connection portions, and/or communication devices that allow for connection, networking, and/or communication with other devices. In some examples, the computing system 150 may be networked with one or more other communication systems and/or one or more networks (e.g., local area networks, wide area networks, etc.) through the I/O circuitry 154.

In the example of FIG. 1, the computing system 150 additionally includes processing circuitry 156, memory circuitry 158, and a user interface (UI) 160. The processing circuitry 156, memory circuitry 158, user interface 160, and I/O circuitry 154 are all in electrical communication through a common electrical bus 162. The memory circuitry 158 is configured to store machine readable instructions, as well as data received from the I/O circuitry 154, processing circuitry 156, and/or UI 160. The processing circuitry 156 is configured to process data received from the UI 160 and/or I/O circuitry 154, and/or machine readable instructions stored in the memory circuitry 158. As shown, the memory circuitry 158 includes a monitoring system control process 300, discussed further below.

In some examples, data received by the computing system transceiver 152 may be displayed and/or otherwise indicated to a user via the user interface 160. While shown as part of the computing system 150 in the example of FIG. 1, in some examples, the user interface 160 may be separate from the computing system 150. For example, the user interface 160 may be part of (and/or connected to) a welding power supply. As another example, the user interface 160 may be part of and/or connected to a welding remote (e.g., mobile device, laptop, remote control, etc.) that communicates with a welding-type power supply via a wireless communication channel or a wired cable connection. As another example, the user interface 160 may be part of (and/or connected to) a welding helmet.

In some examples, the user interface 160 may comprise one or more display screens, audio speakers, and/or input mechanisms (e.g., keyboard, mouse, microphones, touch screen display, data ports, etc.). In some examples, the user interface 160 may continually indicate and/or display data received from the computing system transceiver 152. In some examples, the user interface 160 may only continually indicate and/or display data received from the computing system transceiver 152 in response to some signal, command, and/or input. In some examples, the user interface 160 may be configured to provide a warning (and/or alert, alarm, feedback, etc.). The warning may be a visual, audio, and/or other type of warning, such as an emphasized visual indication shown on the display screen of the user interface, and/or a klaxon, siren, and/or other sound that may be associated with a warning. The warning may serve to alert a user.

Figure 2:
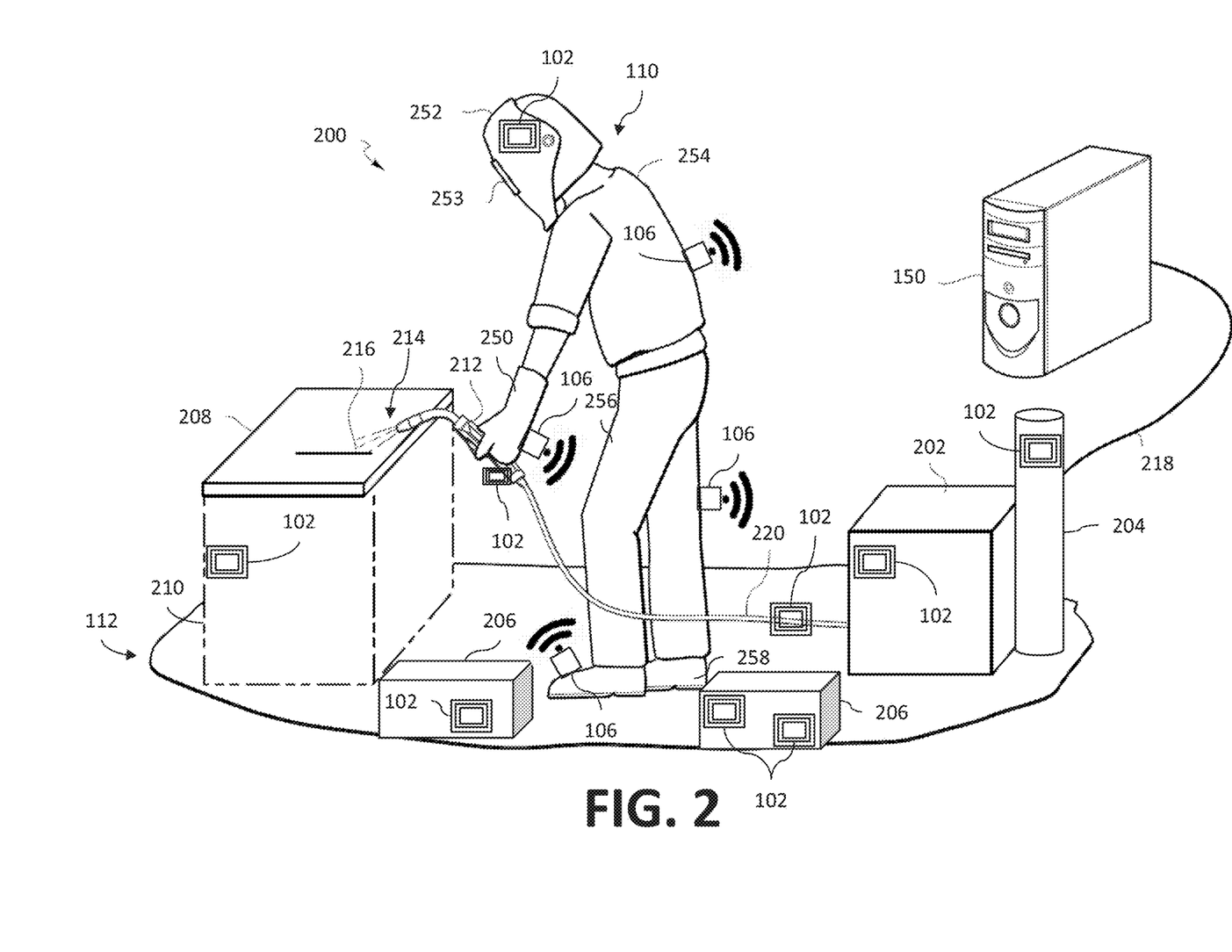
FIG. 2 is an illustration of an example welding system with the monitoring system of FIG. 1, in accordance with aspects of this disclosure.

FIG. 2 shows an example of the monitoring system 100 in conjunction with a welding system 200 within a welding-type production cell 112, according to the present disclosure. As shown, the welding system 200 includes the computing system 150, a welding-type power source 202 (e.g., a welding-type power source, a welding-type power supply, etc.), a gas cylinder 204, storage bins 206, a workpiece 208, a welding bench 210, and a welding torch 212 (e.g., a welding gun, a handheld welding torch, a robotic torch, a semi-automatic torch, etc.). As shown, the workpiece 208 is positioned atop the welding bench 210. In some examples, the workpiece 208 may be clamped and/or otherwise secured to the welding bench 210, such as via a clamp (not shown). In the example of FIG. 2, the welding torch 212 receives power from the welding-type power source 202 and uses the power to create an arc 214 that is applied to the workpiece 208 to create a weld 216.

In the example of FIG. 2, the computing system 150 is connected to the power source 202 through a computing cable 218, and the power source 202 is connected to the welding torch 212 through a welding cable 220. In some examples, the computing system 150 may be in wireless communication with the power source 202. In some embodiments, the computing system 150 may be part of the power source 202. In some examples, the computing system 150 may be coupled to a display or other output device (not shown). In some examples, the computing system 150 may be configured to use a display that is part of the power source 202, the computing system 150, and/or a separate display (e.g., a welding helmet 252 worn by the operator 110).

In some examples, the power source 202 may house one or more wire spools and/or filler spools used to provide the welding torch 212 with welding material (e.g., metal and/or tungsten electrode wire, etc.). In some examples, the power source 202 may be configured to automatically feed the welding torch 212 with the welding material and to provide a shield gas (e.g., an inert shield gas) through the welding cable 220. In the example of FIG. 2, the power source 202 is connected to the gas cylinder 204, which may provide shielding gas to the power source 202 and/or welding torch 212. In some examples, the power source 202 may include (and/or control) one or more valves through which the shielding gas flows.

In the example of FIG. 2, the welding torch 212 is configured to generate an arc 214 through which droplets of welding material are used to form a weld 216 on a workpiece 208. In some examples, the power source 202 may also be connected to the workpiece 208 and/or welding bench 210 through a ground cable, a negative cable, and/or a work lead (not shown). In some examples, the power source 202 is configured to provide welding-type power, current, and/or voltage to the welding torch 212, such as to a consumable electrode (e.g., tip of the feeder wire and/or material) or a nonconsumable electrode of the torch 212, to form the arc 214. In some examples, the electrode of (and/or moving through) the welding torch 212 may deliver current to the workpiece 208 through the arc 214. In the welding system 200, the welding operator 110 controls the location and operation of the electrode by manipulating the torch 212 and triggering the starting and stopping of the welding process.

The welding operator 110 begins a welding operation in the welding cell 112 by putting or clamping one or more workpieces 208 to be welded into a fixture, which positions the workpiece 208 or workpieces 208 in the proper orientation for welding. The welding operator 110 positions the welding torch 212, starts the power source 202 to create a welding arc 214, moves the welding torch 212 to apply the weld 216 to the location in a pre-specified manner, and then stops the welding process when the weld is complete. One or more additional and/or sequential welds 216 may be applied to the workpiece 208 or workpieces 208. The welded assembly is then removed and/or unclamped from the welding bench 210 and transferred to another welding cell 112 for additional welding operations, or into a holding area (e.g., bin 206) for welded assemblies.

In the example of FIG. 2, the welding torch 212 is held by the welding operator 110. The welding operator 110 wears gloves 250 with which to hold the welding torch 212, a welding helmet 252 to shield the face while welding, as well as upper body wear 254 (e.g., shirt, jacket, etc.), lower body wear 256 (e.g., pants), and footwear 258 (e.g., shoes, boots, etc.) to cover the rest of the body. As shown, welding helmet 252 includes a viewing port and/or display 253. In some examples, the welding helmet 252, upper body wear 254, lower body wear 256, and/or footwear 256 may be considered wearable apparel 108.

In the example of FIG. 2, tag readers 106 are affixed to the gloves 250, upper body wear 254, lower body wear 256, and footwear 258. While tag readers 106 are affixed to all of the previously enumerated wearable apparel 108 in FIG. 2, in some examples, a tag reader 106 may be affixed to less than all of the wearable apparel 108 worn by the welding operator 110. As shown, tags 102 are affixed to the welding bench 210, supply bins 206, welding cable 220, welding-type power source 202, gas cylinder 204, welding helmet 252, and welding-torch 212. In some examples, all of the welding bench 210, supply bins 206, welding cable 220, welding-type power source 202, gas cylinder 204, welding helmet 252, and welding-torch 212 may be considered items 104. In some examples, tags 102 may be affixed to more or fewer items 104. In some examples, tags 102 and tag readers 106 may switch places.

In the example of FIG. 2, one storage bin 206 has a tags 102 at different locations on the storage bin 206. In some examples, one tag 102 may be read when the welding operator 110 reaches into the bin 206 near the top (e.g., when the bin is relatively full) while another tag 102 is read when the welding operator 110 reaches into the bin near the bottom (e.g., when the bin is relatively empty). Reading the tag 102 near the top of the bin 206 may trigger a different workflow even than reading the tag 102 near the bottom of the bin 206 (e.g., tip replacement and/or proper/improper bin v. resupply needed).

In operation, when the welding operator 110 (and/or the tag reader 106 attached to the wearable apparel 108 of the welding operator 110) comes into communication range of the tagged item 104 (and/or the tag 102 on the tagged item 104), the tag reader 106 may read the tag 102, and send data stored on the tag 102 to the computing system 150. For example, a tag reader on a glove worn by the operator may read a tag attached to a storage bin 206 containing replacement welding torch contact tips when the operator reaches into the bin 206 to obtain a replacement contact tip. The tag 102 may store data representative of the storage bin 206 and/or contact tips stored within the bin, and the tag reader 106 may read this data and send the data to the computing system 150. The computing system 150 may then process the data via a monitoring system control process 300 to determine whether one or more workflow events are associated with the data, and, if so, execute an event script corresponding to the workflow event.

Figure 3:
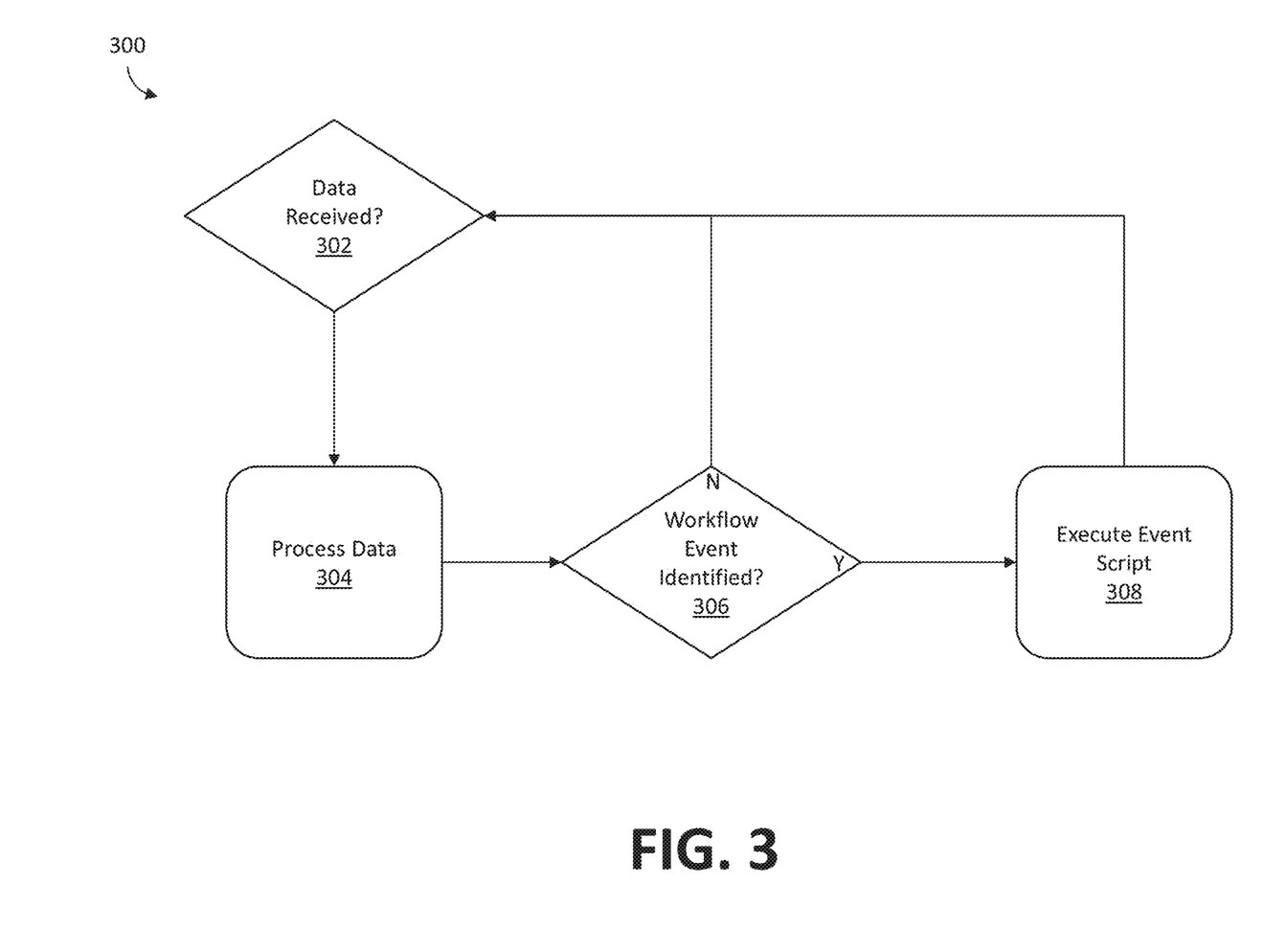
FIG. 3 is a flow diagram illustrating an example monitoring system control process, in accordance with aspects of this disclosure.

FIG. 3 is a flowchart illustrating an example monitoring system control process 300. In some examples, the control process 300 may be implemented in machine readable instructions stored in memory circuitry 158. In some examples, the control process 300 may be implemented via discrete and/or analog circuitry. As shown, the control process 300 operates in a loop at block 302, continually waiting for data to be received by the computing system transceiver 152 and/or I/O circuitry 154 from the tag reader(s) 106. Once data is received, the control process 300 proceeds to block 304, where the data is processed, such as by the processing circuitry 156. In some examples, processing may comprise decoding and/or parsing the data to yield relevant information. In some examples, such relevant information may include, for example, information regarding the tag 102 from which the data was read and/or metadata regarding the tag reader 106 which did the reading.

As shown, once processed, the control process 300 proceeds to block 306, where the control process 300 determines whether the data is associated with a workflow event. If the data is not associated with a workflow event, the control process 300 returns to block 302. If the data is associated with a workflow event, the control process 300 proceeds to block 308, where the control process 300 determines and/or executes an event script associated with the workflow event. In some examples, the memory circuitry 158 may include one or more memory structures (e.g., databases, lookup tables, etc.) that retain information regarding relevant workflow events and/or associated event scripts. In some examples, the control process 300 may communicate with outside information repositories (e.g., remote computers, cloud servers, internet archives, etc.) through the I/O circuitry 154 to obtain information regarding workflow events and/or event scripts.

Workflow events may be any number of anticipated situations that call for some sort of action within and/or related to the welding-type production cell. In some examples, workflow events may be identified based on a timing and/or order in which tag data is received. For example, receiving tag data corresponding to a clamp, followed by tag data corresponding to a storage bin 206, may result in a part completion event being identified. In some examples, a downtime event may be identified if a threshold amount of time passes without receiving any tag data (e.g., at block 302) and/or without identifying any events. In some examples, some workflow events may be identified based on certain combinations and/or patterns of data received over time, and/or certain combinations and/or patterns of other workflow events and/or event scripts that have taken been identified and/or executed time. For example, receiving tag data corresponding to a contact tip storage bin 206 and the welding torch 212 may result in a tip change event being identified. As another example, identifying several tip change events close together in time may result in a maintenance event being identified. In some examples, this timing, order, pattern, and/or combination dependent workflow identification may be implemented via one or more state machines, where one or more state transitions may occur in response to reception (and/or processing) of tag data and/or identification of workflow events.

Event scripts may include one or more actions taken by the computing device or instructions provided to an operator by the computing device. Example workflow events may include a tip change event, a part identification event, a part loading event, a clamp start/stop event, a torch cleaning event, a wire supply change event, a gas supply change event, a downtime event, a weld cell gate open event, a tool or equipment usage event, an improper bin event, a proper bin event, a low stock bin event, and/or a command event. Example event script actions include alerts, alarms, communications to personnel (e.g., automatically generated text message and/or email messages to maintenance, supervisors, quality assurance, production, procurement, security, etc.), procurement and/or resupply orders, logging of tag and/or event data, and/or display of information (e.g., training images and/or videos, instructional images and/or videos, diagnostic information, graphs, charts, etc.). In some examples, the computing system may also log one or more of the event and/or event script for diagnostic purposes.

Figure 4:
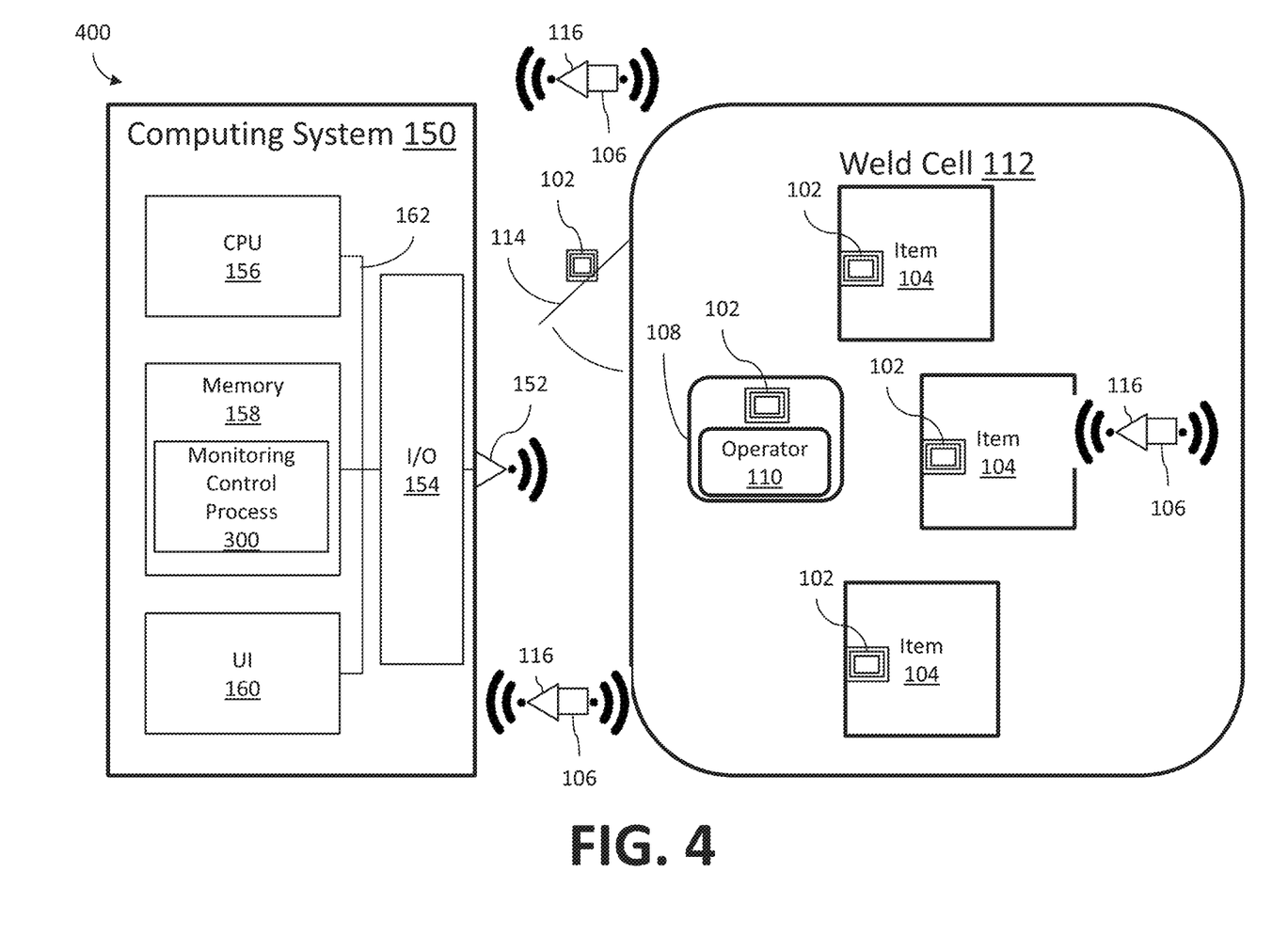
FIG. 4 is a block diagram of another example monitoring system, in accordance with aspects of this disclosure.

FIG. 4 shows an example of a monitoring system 400. The monitoring system 400 is similar to the monitoring system 100. However, the tags 102 and tag readers 106 in the monitoring system 400 are arranged so that one or more techniques (e.g., triangulation) may be used to determine position within and/or near the welding cell 112.

In the example of FIG. 4, multiple tag readers 106 are positioned in and/or around the welding cell 112, such as in a triangle and/or other pattern. While some tag readers 106 are shown as being within the welding cell 112, while other tag readers 106 are shown as being positioned outside of the welding cell 112, in some examples all the tag readers 106 may be positioned within or outside of the welding cell 112. In the example of FIG. 4, one or more longer range communication protocols may be used by the tag readers 106 to locate and/or position the tags 102. For example, some short-wavelength ultra high frequency (UHF) radio waves in the industrial, scientific, and medical (ISM) radio frequency band, between approximately 2.4 and 2.485 Giga Hertz (GHz) (commonly referred to as Bluetooth®) protocols may be used for location and/or positioning purposes. In some examples, the tag readers 106 may be cameras and the tags 102 may be markers or bar codes. By using location and/or position data collected by several tag readers 106 in known positions to one another, a location and/or position of the tags 102 (and/or the tagged items 104) may be determined.

In some examples, the monitoring system 400 may use the position and/or location data to identify workflow events, and/or to augment other events and/or event scripts with the position and/or location data. In such an example, the welding operator 110 (and/or wearable apparel 108 worn by the welding operator 110) may be affixed with a tag 102, so that the monitoring system 400 can determine location of the welding operator 110. In some examples, the welding operator 110 (and/or wearable apparel 108 worn by the welding operator 110) may be affixed with a tag reader 106, such that position and/or location of tagged items 104 may be determined relative to the welding operator 110. In some examples, the monitoring system 400 and monitoring system 100 may be used together, with position data used to augment identification of workflow events and/or execution of event scripts.

The present methods and systems may be realized in hardware, software, and/or a combination of hardware and software. Example implementations include an application specific integrated circuit and/or a programmable control circuit.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. A welding-type monitoring system of a welding-type production cell, comprising:

a tag attached to a first item associated with the welding-type production cell, the tag storing data relating to the first item, the first item comprising a gate of the welding-type production cell, a gate locking latch of the welding-type production cell, a wall of the welding-type production cell, a ceiling of the welding-type production cell, a floor of the welding-type production cell, a light fixture of the welding-type production cell, a pillar of the welding-type production cell, a window of the welding-type production cell, or a sink of the welding-type production cell;

a tag reader attached to a second item associated with the welding-type production cell, the tag reader configured to automatically read data from the tag using a close proximity communication protocol when the tag reader is in communication range of the tag; and computing circuitry configured to:
receive the data from the tag reader,
identify an event associated with the data, and
trigger an event script corresponding to the event in response to identifying the event.

2. The system of claim 1, wherein the tag is a radio frequency identification (RFID) tag or near field communication (NFC) tag, the tag reader is an RFID interrogator or NFC interrogator, and the close proximity communication protocol is an RFID protocol or an NFC protocol.

3. The system of claim 1, wherein the computing circuitry is further configured to trigger a downtime event script in response to determining that a time limit has passed without receiving the data from the tag reader, the downtime event script comprising an alert, a communication, or a logging of a downtime event.

4. The system of claim 1, wherein the tag is a Bluetooth tag or a Zigbee tag, the tag reader is a Bluetooth interrogator or a Zigbee interrogator, and the close proximity communication protocol is a Bluetooth protocol or a Zigbee protocol.

5. The system of claim 1, wherein the second item comprises wearable apparel comprising a glove, a shirt, a jacket, a watch, a wristband, or an identification tag.

6. The system of claim 1, wherein the event script comprises a procurement order or resupply order.

7. The system of claim 1, wherein the computing circuitry is configured to identify the event from among a plurality of potential events stored in memory circuitry, based on the data from the tag reader.

8. The system of claim 1, wherein the event script comprises one or more actions taken by the computing circuitry or instructions provided to an operator by the computing circuitry.

9. A welding-type monitoring system, comprising:
a first tag attached to an item at a first location;
a second tag attached to the item at a second location;
a tag reader attached to a second item, the tag reader being configured to automatically read first data from the first tag using a close proximity communication protocol when the tag reader is in communication range of the first tag, and automatically read second data from the second tag using the close proximity communication protocol when the tag reader is in communication range of the second tag; and
computing circuitry configured to:
receive the first data and the second data from the tag reader,
identify an event based on (i) an order in which the first data and the second data are received from the tag reader, or (ii) an amount of time between reception of the first data and the second data from the tag reader, and
trigger an event script corresponding to the event in response to identifying the event.

10. The system of claim 9, wherein the first item to which the tag is attached comprises a storage bin, the storage bin comprising a welding tip storage bin, a wire spool storage bin, a scrap bin, a component supply bin, or a completed part bin.

11. The system of claim 9, wherein the computing circuitry is configured to identify the event based on the order in which the first data and the second data are received from the tag reader.

12. The system of claim 9, wherein the computing circuitry is configured to identify the event based on the amount of time between reception of the first data and the second data from the tag reader.

13. The system of claim 9, wherein the computing circuitry is configured to identify the event from a plurality of potential events.

14. The system of claim 9, wherein the second item comprises wearable apparel comprising a glove, a shirt, a jacket, a watch, a wristband, or an identification tag.

15. The system of claim 9, wherein the tag comprises an RFID, NFC, Zigbee, or Bluetooth tag, the tag reader comprises an RFID, NFC, Zigbee, or Bluetooth reader, the close proximity protocol is an RFID, NFC, Zigbee or Bluetooth communication protocol.

16. A welding-type monitoring system of a welding-type production cell, comprising:
a tag attached to an item associated with the welding-type production cell, the tag storing data relating to the item, the item comprising a storage bin or a cell fixture,
the storage bin comprising a welding tip storage bin, a wire spool storage bin, a scrap bin, a component supply bin, or a completed part bin,
the cell fixture comprising a gate, a gate locking latch, a wall, a ceiling, a floor, a light fixture, a pillar, a window, a conveyor belt, or a sink;
a plurality of tag readers arranged around the tag, the tag readers configured to automatically read relative position data from the tag using a communication protocol; and
computing circuitry configured to:
receive the relative position data from the tag readers,
determine an actual position of the item based on an analysis of the relative position data,
identify an event associated with the actual position of the item, and
trigger an event script corresponding to the event in response to identifying the event.

17. The welding-type monitoring system of claim 16, wherein the tag comprises a first tag attached to a first item, the system further comprising a second tag attached to wearable apparel configured to be worn by an operator, the plurality of tag readers being arranged around the first tag and the second tags,
the tag readers configured to automatically read relative position data from the first tag and the second tag using a communication protocol, and
the computing circuitry being configured to
determine an actual position of the item, and a relative position of the item with respect to the operator, based on an analysis of the relative position data, and identify the event associated with the actual position of the item and the relative position of the item with respect to the operator.

18. The welding-type monitoring system of claim 16, wherein the communication protocol is a short-wavelength ultra-high radio frequency protocol.

19. The welding-type monitoring system of claim 17, wherein the wearable apparel comprises a glove, a boot, a helmet, a shirt, a harness, a jacket, pants, a watch, a wristband, a belt, a necklace, glasses, a hat, or an identification tag.

\* \* \* \* \*